(12) United States Patent
Ishikawa et al.

(10) Patent No.: US 11,390,122 B2
(45) Date of Patent: Jul. 19, 2022

(54) TIRE

(71) Applicant: BRIDGESTONE CORPORATION, Tokyo (JP)

(72) Inventors: Satoshi Ishikawa, Tokyo (JP); Akihiro Kawakita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 513 days.

(21) Appl. No.: 16/096,451

(22) PCT Filed: Apr. 11, 2017

(86) PCT No.: PCT/JP2017/014789
§ 371 (c)(1),
(2) Date: Oct. 25, 2018

(87) PCT Pub. No.: WO2017/187960
PCT Pub. Date: Nov. 2, 2017

(65) Prior Publication Data
US 2019/0126690 A1    May 2, 2019

(30) Foreign Application Priority Data

Apr. 28, 2016  (JP) .............................. JP2016-091321
Apr. 28, 2016  (JP) .............................. JP2016-091326

(51) Int. Cl.
*B60C 11/12*    (2006.01)
*B60C 11/13*    (2006.01)
*B60C 11/03*    (2006.01)

(52) U.S. Cl.
CPC ........ *B60C 11/125* (2013.01); *B60C 11/0302* (2013.01); *B60C 11/13* (2013.01);
(Continued)

(58) Field of Classification Search
CPC .............. B60C 11/0302; B60C 11/125; B60C 11/1353; B60C 11/1369;
(Continued)

(56) References Cited

U.S. PATENT DOCUMENTS 7,341,083 B2 *   3/2008   Iwasaki ................... B60C 11/11
                                                     152/209.18
2006/0011279 A1   1/2006   Miyasaka
(Continued)

FOREIGN PATENT DOCUMENTS

CA        2773444    *   5/2011
CN        1708417 A       12/2005
(Continued)

OTHER PUBLICATIONS

English machine translation of JPH11-139114. (Year: 1999).*
(Continued)

*Primary Examiner* — Robert C Dye
(74) *Attorney, Agent, or Firm* — Oliff PLC (57) ABSTRACT

A tire has a tread surface, the tread surface including a circumferential groove extending in a tire circumferential direction, a lug groove extending in a direction intersecting the circumferential groove, and a plurality of land parts partitioned by the circumferential groove and the lug groove. A width-direction groove extending in a tire widthwise direction is formed on a land part of the plurality of land parts. An in-groove sipe is arranged along one side edge of a groove bottom of the width-direction groove.

4 Claims, 3 Drawing Sheets

(52) U.S. Cl.
CPC ...... *B60C 11/1315* (2013.01); *B60C 11/1353* (2013.01); *B60C 11/1369* (2013.01); *B60C 2011/0351* (2013.01); *B60C 2011/0362* (2013.01); *B60C 2011/1361* (2013.01)

(58) Field of Classification Search
CPC ..... B60C 2011/0381; B60C 2011/0351; B60C 2011/0362; B60C 2011/0361
See application file for complete search history.

(56) References Cited

U.S. PATENT DOCUMENTS

| | | | |
|---|---|---|---|
| 2008/0041509 A1 | 2/2008 | Shimizu | |
| 2009/0145529 A1 | 6/2009 | Miyazaki | |
| 2013/0146190 A1 | 6/2013 | Aoki et al. | |
| 2016/0001599 A1* | 1/2016 | Minami | B60C 3/04 152/209.25 |

FOREIGN PATENT DOCUMENTS

| | | |
|---|---|---|
| CN | 101456338 A | 6/2009 |
| CN | 103097147 A | 5/2013 |
| CN | 103097149 A | 5/2013 |
| DE | 102010016978 A1 | 11/2011 |
| DE | 102010060946 * | 6/2012 |
| EP | 0841199 A2 | 5/1998 |
| EP | 2 322 359 A1 | 5/2011 |
| JP | H11-139114 * | 5/1999 |
| JP | H11-139114 A | 5/1999 |
| JP | 2002-29221 A | 1/2002 |
| JP | 2003-63212 A | 3/2003 |
| JP | 2006-213175 A | 8/2006 |
| JP | 2007-62691 A | 3/2007 |
| JP | 2011-183952 A | 9/2011 |
| JP | 2012-35686 A | 2/2012 |
| JP | 2012-040888 A | 3/2012 |
| JP | 2012-76684 A | 4/2012 |
| JP | 2015-009775 A | 1/2015 |
| JP | 2016-55817 A | 4/2016 |

OTHER PUBLICATIONS

Mar. 27, 2019 Search Report issued in European Patent Application No. 17789247.8.
Jul. 18, 2017 International Search Report issued in International Patent Application No. PCT/JP2017/014789.

* cited by examiner

TIRE

TECHNICAL FIELD

The present invention relates to a tire having a tread surface including thereon a circumferential groove, a lug groove extending in a direction intersecting the circumferential groove, and a plurality of land parts partitioned by the circumferential groove and the lug groove.

RELATED ART

Conventionally, for winter tires, high wet brake performance has been required in addition to snow performance.

For this reason, measures have been proposed for forming a width-direction groove instead of a sipe in a land part to increase drainage performance in the land part and using an land part edge of the width-direction groove contributing more to snow performance than a sipe edge to increase an edge effect (see Patent Literature 1). Hereinafter, snow braking performance and snow traction performance are referred to as snow performance. Dry brake performance refers to braking performance on a dry road surface.

CITATION LIST

Patent Literature

Patent Literature 1: JP 2015-9775 A

SUMMARY OF INVENTION

Technical Problem

Incidentally, when a depth of a width-direction groove is the same as that of a sipe, a rigidity of a land part is greatly reduced. In order to avoid a reduction in rigidity of a land part, shallow width-direction grooves have been conventionally set so as to maintain dry brake performance and wet brake performance while securing the rigidity of the land part. Therefore, there is a problem that sufficient snow performance is not obtained.

The present invention has been made in view of the above-problems, and it is an object to provide a tire which has improved snow performance while securing the rigidity of a land part.

Solution to Problem

A tire according to first aspect of the present invention has a tread surface, the tread surface including a circumferential groove extending in a tire circumferential direction, a lug groove extending in a direction intersecting the circumferential groove, and a plurality of land parts partitioned by the circumferential groove and the lug groove. A width-direction groove extending in a tire widthwise direction is formed on a land part of the plurality of land parts. An in-groove sipe is arranged along one side edge of a groove bottom of the width-direction groove.

A tire according to second aspect of the present invention has a tread surface, the tread surface including a circumferential groove extending in a tire circumferential direction, a lug groove extending in a direction intersecting the circumferential groove, a plurality of land parts partitioned by the circumferential groove and the lug groove, and a platform formed on a groove side wall of the lug groove. The circumferential groove includes a center-side circumferential groove and a lateral-side circumferential groove. A center-side land part on an inner side in a tire widthwise direction and a lateral-side land part on an outer side in a tire widthwise direction are arranged as the land part, and the center-side land part and the lateral-side land part are adjacent to each other in a tire widthwise direction, across the lateral-side circumferential groove. The lug groove has an inclination angle with respect to a tire widthwise direction gradually decreasing from the center-side land part toward the lateral-side land part. The platform is formed by a series of a center-side platform continuous with an inner side of the center-side land part in a tire radial direction; a lateral-side circumferential groove platform continuous with an inner side of the lateral-side circumferential groove in a tire radial direction; and a lateral-side platform continuous with an inner side of the lateral-side land part in a tire radial direction. In the center-side land part and the lateral-side land part, an outer edge of the platform in a tire radial direction when viewed from a side of the lug grooves is shaped to follow a shape of a land part tread surface.

Advantageous Effects of Invention

The tire according to the aspects of the present invention improves snow performance while securing the rigidity of a land part.

DESCRIPTION OF EMBODIMENTS

Hereinafter, embodiments of the present invention will be described with reference to the accompanying drawings (FIGS. 1 to 4). In the following description, the same or similar parts are denoted by the same or similar reference numerals, and the detailed description thereof is appropriately omitted.

The tire 10 described in the present embodiment is an optimum tire for use as a winter tire (particularly lamellen tire).

The tire 10 has a tread surface including thereon a circumferential groove 12 extending in a tire circumferential direction U, a lug groove 14 extending in a direction intersecting the circumferential groove 12, and a plurality of land parts 16 partitioned by the circumferential groove 12 and the lug groove 14.

In the present embodiment, the circumferential groove 12 includes a circumferential main groove 12c (a center-side circumferential groove) through which a tire equator line CL passes, and a lateral-side circumferential groove 12d positioned on each outer side from the circumferential main groove 12c in a tire widthwise direction. The land parts 16 include a center-side land part 18 through which the circumferential main groove passes and a lateral-side land part 20. Here, the lateral-side land part 20 is a land part positioned on an outer side from the lateral-side circumferential groove 12d in a tire widthwise direction. The circumferential groove 12 may be inclined with respect to a tire circumferential direction U, and the lug groove 14 may be inclined with respect to a tire widthwise direction Y. Furthermore, in the present embodiment, the lateral-side circumferential groove 12d is shallower than those of the circumferential main groove 12c and the lug groove 14, and the lug groove 14 is shallower than that of the circumferential main groove 12c.

(Lug Groove)

Figure 1:
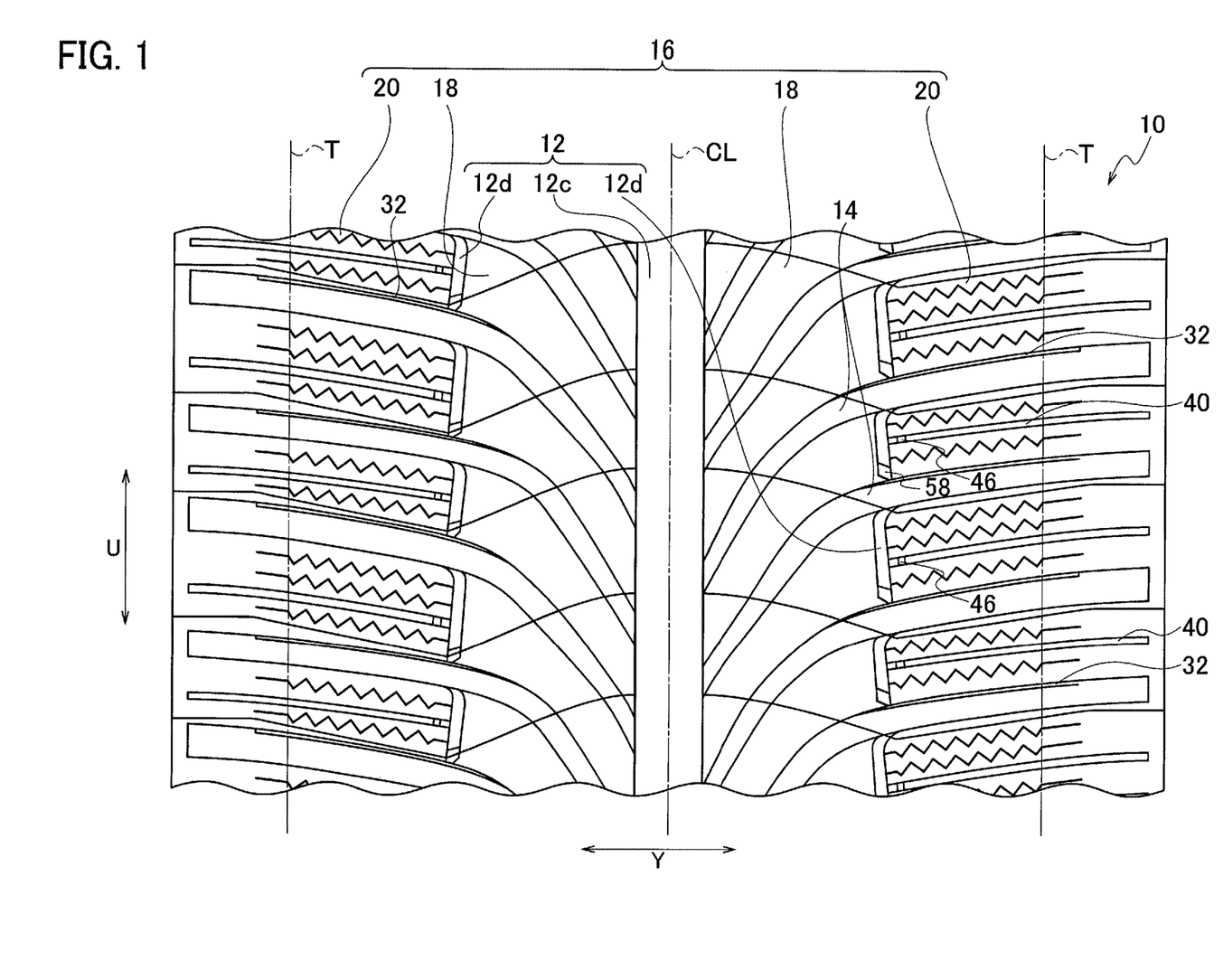
FIG. 1 is a plan view showing a tread surface of a tire according to an embodiment of the present invention.

A lug groove 14 has a curved shape protruding upward in the drawing of FIG. 1. In the lug groove 14, an inclination angle θ (see FIG. 2(a)) with respect to a tire widthwise direction Y gradually decreases from a center-side land part 18 to a lateral-side land part 20.

A groove-side wall of the lug groove 14 is provided with a platform 32 serving as a guide for a use limit of the tire as a winter tire. The platform 32 includes a center-side platform 19 continuous with an inner side of a center-side land part 18 in a tire radial direction, a lateral-side circumferential groove platform 13 continuous with an inner side of a lateral-side circumferential groove 12d in the tire radial direction, and a lateral-side platform 21 continuous with an inner side of a lateral-side land part 20 in the tire radial direction.

In the center-side land part 18 and the lateral-side land part 20, an outer edge 32e of the platform 32 in the tire radial direction is shaped to follow a shape of a land part tread surface 16s when viewed from the lug groove side, and as an inclination angle β of the lug groove 14 with respect to the tire widthwise direction Y becomes smaller (see FIG. 2(a)), an inclination angle α (see FIG. 2(c)) of the platform 32 with respect to the tire radial direction K becomes larger.

Here, as illustrated in FIG. 2(b), in a radial height of the outer edge 32e of the platform 32 in the tire radial direction when viewed from a side of the lug groove 14, a distance d to the land part tread surface 16s in a direction normal to the tire has a predetermined constant distance, from a platform start point 32p being an inner side end in the tire widthwise direction to a platform end point 32q being an outer side end in the tire widthwise direction, and at the platform end point 32q, the outer edge 32e in the tire radial direction is positioned at the same height as that of the groove bottom 14b of the lug groove 14 (that is, the height from the groove bottom 14b is zero).

When viewed from above the tread surface, a dimension W (see FIG. 2(a)) of the platform 32 in a tire circumferential direction is a predetermined constant dimension from the platform end point 32q to the lateral-side circumferential groove 12d. Then, the dimension W gradually decreases from the lateral-side circumferential groove 12d to an inner side in the tire widthwise direction, and becomes zero at the platform start point 32p.

A curvature radius (curved shape) of the lug groove 14 (inclined main groove) greatly changes at an intersection 11 with the lateral-side circumferential grooves 12d. As the lug groove 14 extends outward from the tire equator side in the tire widthwise direction, the radius of curvature of the lug groove 14 gradually increases. Then the curvature radius of the lug groove 14 dramatically increases at the intersection 11. It can also be said that an inflection point G of the curved shape of the lug groove 14 is positioned on the intersection 11. On the outer side from the lateral-side circumferential groove 12d in the tire widthwise direction, that is, in the lateral-side land part 20, the lug groove 14 curves substantially linearly.

In the lug groove portion adjacent to the lateral-side land parts 20, at the same position in the tire widthwise direction Y, the inclination angle β of a lug groove wall 20s on a leading edge side of a lateral-side land part 20 with respect to the tire widthwise direction Y may be smaller than the inclination angle γ (see FIG. 2(a)) of a lug groove wall 20k on a trailing edge side of a lateral-side land part 20 with respect to the tire widthwise direction Y.

Furthermore, the shape of the platform 32 may be defined as follows. In a position in a tire widthwise direction in which the platform 32 is disposed, when viewing the tread surface, a position of an intersection between a line segment at a first groove wall angle on the leading side of the lateral-side land part 20, and a line segment at a second groove wall angle on the leading side of the lateral-side land part 20 is defined as the platform start point. The first groove wall angle is equal to an angle of a groove wall on the leading side of the platform defined as a thickness gauge when viewing a predetermined tread surface. Furthermore, in a radial side view (that is, a side view from the lug groove 14), a position of an intersection between a line segment defined as a predetermined distance from a shape of the tread surface or a predetermined concentric circle positioned on the inner side in the radial direction concentric with the shape of the tread surface, and a line segment of the groove bottom beyond a tread end T is defined as the platform end point.

In this case, in a radial side view, a radial height of the tire in which the platform 32 is disposed is a predetermined distance from the tread surface shape or a predetermined concentric circle concentric with the shape of the tread surface on the inner side in the radial direction, in a range from the platform start point on the inner side in the tire widthwise direction to a tread end T, and the radial height becomes zero at the position of the intersection with the line segment of the groove bottom from the tread end T.

When viewing the tread surface, a circumferential width in which the platform 32 is disposed has a predetermined identical width, in a range from the position of the platform end point to the inflection point G or the intersection between the line segment of the first groove wall angle on the leading side of the land part and the line segment at the second groove wall angle on the leading side of the land part, beyond the tread end T, and the circumferential width gradually decreases from the inflection point G to the inner side in the tire widthwise direction, and becomes zero at the platform start point.

(Lateral-Side Land Part)

In a lateral-side land part 20, a width-direction groove 40 (auxiliary lug groove) extending in a tire widthwise direction Y is formed. In the width-direction groove 40, an in-groove sipe 42 is arranged along one side edge of a groove bottom when viewing a tread surface. One end of the width-direction groove 40 opens at a tread end T and the other end of the width-direction groove 40 is formed into a terminal end 40e without opening to a lateral-side circumferential groove 12d. Furthermore, in the present embodiment, the in-groove sipe 42 is formed only along a side edge 40s positioned on the leading side S of the width-direction groove 40.

Figure 3:
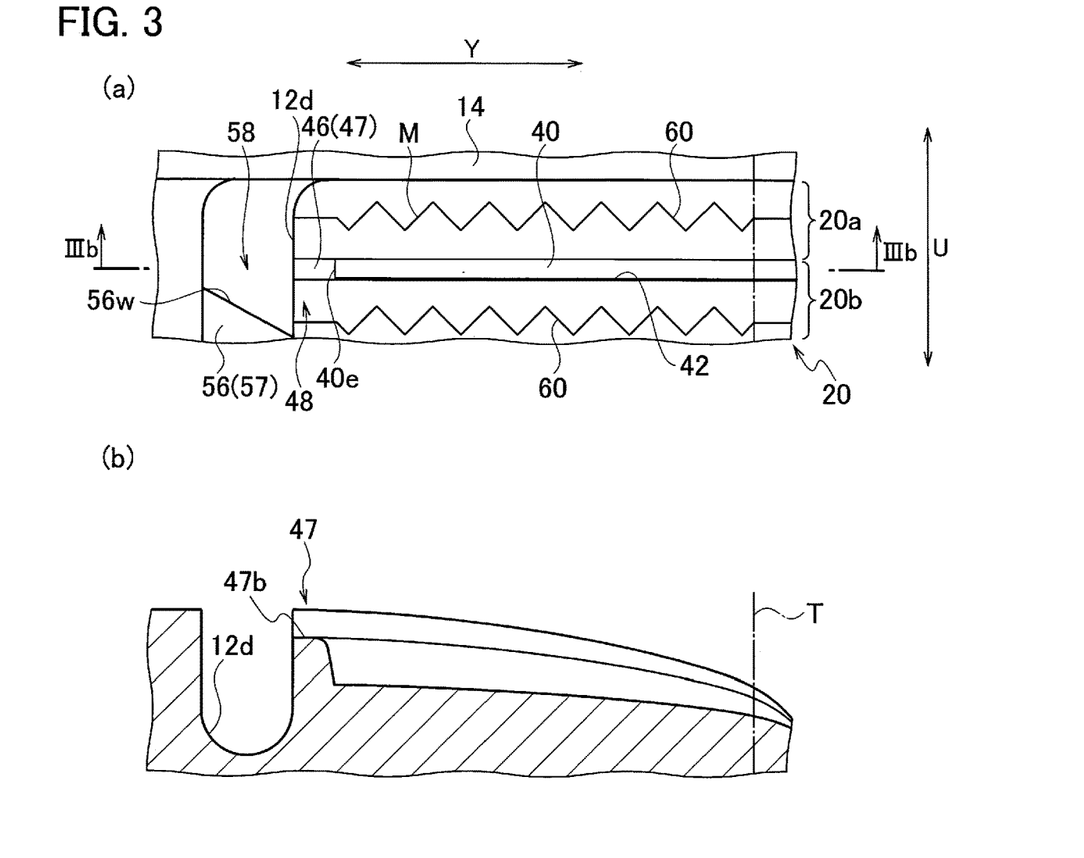
FIG. 3(a) is a schematic enlarged perspective view for explaining a lateral-side land part of the tire according to the embodiment of the present invention.
FIG. 3(b) is a schematic sectional view taken along the width direction groove of the tire according to the embodiment of the present invention, taken along line IIIb-IIIb in FIG. 3(a).
Figure 4:
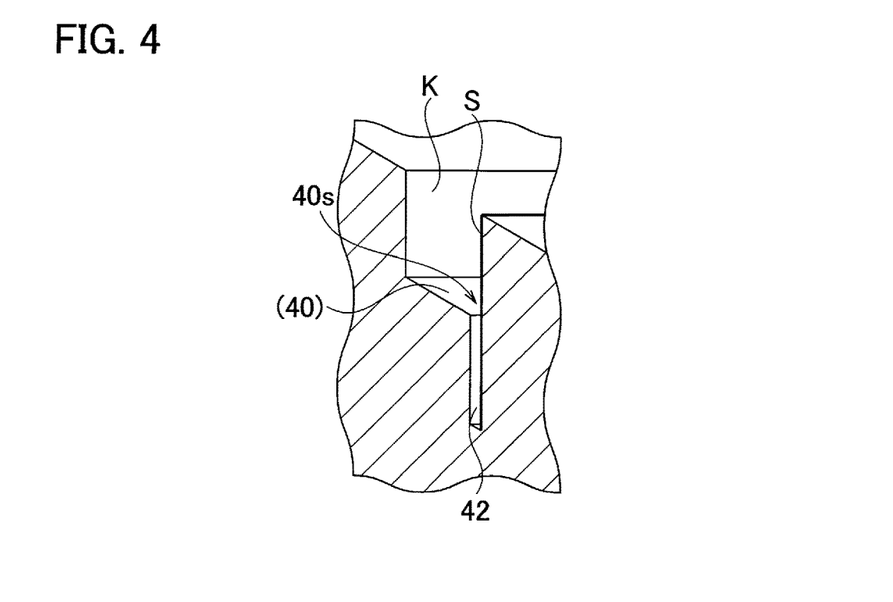
FIG. 4 is a sectional view in the tire circumferential direction for explaining the lateral-side land part of the tire according to the embodiment of the present invention.

In the tire 10 according to the present embodiment, the lateral-side land part 20 is divided into two land-part sections 20a and 20b adjacent to each other in a tire circumferential direction U by the width-direction groove 40. In the tire 10 according to the present embodiment, a circumferential connection portion 46 (see FIGS. 1 and 3) connecting the two land-part sections 20a and 20b is arranged so as to be adjacent to the terminal end 40e of the width-direction groove 40, and the other end of the width-direction groove 40 is configured to be the terminal end 40e.

A height of the circumferential connection portion 46 in the tire radial direction is smaller than a height of a tread surface of the lateral-side land part 20. Accordingly, a first recessed land part 48 having a shallow groove 47 is formed by the two land-part sections 20a and 20b and the circumferential connection portion 46 located between the two land-part sections 20a and 20b, and bridges a space between the two land-part sections 20a and 20b. A groove bottom 47b of the shallow groove 47 is formed by an upper surface of the circumferential connection portion 46.

The tire 10 according to the present embodiment is provided with a widthwise connection portion 56 (see FIGS. 1 and 3) arranged to connect a lateral-side land part 20 and a center-side land part 18 adjacent to the lateral-side land part 20 in the tire widthwise direction Y. A height (radial height of the tire) of the widthwise connection portion 56 is smaller than heights of the land-part sections 20a and 20b and the center-side land part 18, and a second recessed land part 58 having a shallow groove 57 is formed between the lateral-side land part 20 and the center-side land part 18. A groove bottom of the shallow groove 57 is formed by an upper surface of the widthwise connection portion 56.

One or a plurality of sipes 60 extending along the width-direction groove 40 are formed in the land-part sections 20a and 20b. In FIG. 3(a), for ease of understanding, one sipe 60 is drawn as an example in each of land-part sections 20a and 20b. In the present embodiment, the sipe 60 is a zigzag sipe.

Furthermore, in the present embodiment, a groove bottom on a terminal end side (an inner side end in a tire widthwise direction) of the width-direction groove 40 is formed into an inclined surface in which a groove depth gradually become deeper toward the terminal end 40e, and a groove bottom on a side opposite to the terminal end of the width-direction groove 40 is formed into an inclined surface in which the groove depth gradually become shallower toward the outer side in the tire widthwise direction. The inclined surface has a tapered shape, sloped shape, protruding shape, or the like.

(Functions and Effects of Platform)

Although snow performance can be improved by increasing a width of a lug groove which is a radial groove, a rigidity of a land part is reduced due to a reduction in size of each land part (hereinafter simply referred to as a land part) and dry brake performance and steering stability decreases. Thus, a method for achieving both of the rigidity of a land part and snow performance by reinforcing a lug groove increased in width with a platform (see JP 2011-183952 A). However, there has been a trade-off that when a platform is arranged in a land part, the rigidity of the land part is increased and the dry brake performance and the steering stability are improved, but the snow performance is particularly lowered since a volume of the groove decreases.

As illustrated in FIGS. 2(a) and 2(b), in the present embodiment, a platform 32 continuously includes a center-side platform 19 continuous with an inner side of a center-side land part 18 in a tire radial direction, a lateral-side circumferential groove platform 13 continuous with an inner side of a lateral-side circumferential groove 12d in the tire radial direction, and a lateral-side platform 21 continuous with an inner side of a lateral-side land part 20 in the tire radial direction. In the center-side land part 18 and the lateral-side land part 20, an outer edge 32e of the platform 32 in the tire radial direction is shaped to follow a shape of a land part tread surface 16s when viewed from the lug groove side. As the inclination angle (an intermediate value between the inclination angle β and the inclination angle γ) of a lug groove 14 with respect to the tire widthwise direction Y becomes smaller when viewing the tread surface, the inclination angle α (see FIG. 2(c)) of the platform 32 with respect to the tire radial direction becomes larger.

Figure 2:
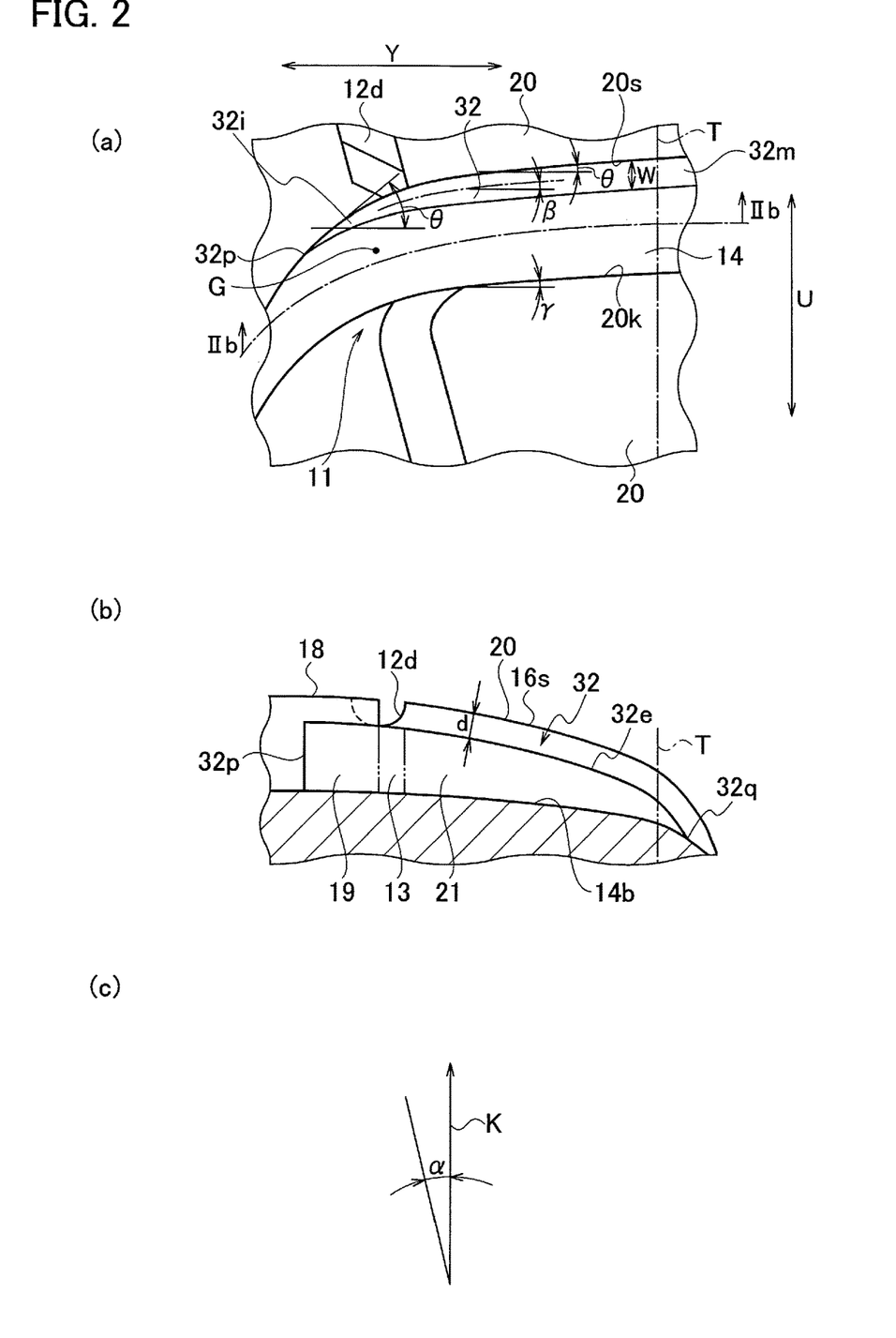
FIG. 2(a) is a schematic enlarged plan view illustrating a platform of the tire according to the embodiment of the present invention.
FIG. 2(b) is a schematic enlarged side view of the tire platform according to the embodiment of the present invention, seen from the side of the lug grooves, taken along line IIb-IIb in FIG. 2(a)
FIG. 2(c) is a schematic side view for explaining the inclination angle of the platform with respect to the tire radial direction.

Owing to this configuration, as illustrated in FIG. 2, in a platform portion 32m formed in a lug groove portion having a small inclination angle θ with respect to the tire widthwise direction Y (that is, a lug groove portion which is important to generate snow traction and snow breaking), the inclination angle α with respect to the tire radial direction is large, and large snow traction and snow braking is generated. In a platform portion 32i formed in a lug groove portion having a large inclination angle θ with respect to the tire widthwise direction Y (that is, a lug groove portion which is not so important to generate snow traction and snow breaking), the inclination angle α with respect to the tire radial direction is small, and a reduction in rigidity of the land part is sufficiently suppressed.

Therefore, it is possible to provide the tire 10 effectively improved in snow performance while maintaining the rigidity of the land part.

Note that, in the present embodiment, the platform 32 is formed to be continuous with the lateral-side circumferential groove platform 13 from the lateral-side platform 21, and is further continuous with the center-side platform 19. Thus the above effects (that is, effects to improve snow performance while maintaining the rigidity of the land part) is achieved considerably.

Furthermore, a radial height of the outer edge 32e of the platform 32 in the tire radial direction when viewed from the lug grooves 14 side is a height in which the distance d to the land part tread surface 16s in a direction normal to the tire has a predetermined constant distance from a platform start point 32p, which is an inner side end in the tire widthwise direction, to a platform end point 32q, which is an outer side end in the tire widthwise direction, and the outer edge 32e in the tire radial direction has the same height as a groove bottom 14b of the lug groove 14 at the platform end point 32q.

This makes it possible to uniformly apply, shear force of snow and edge effect generated by a lug groove portion extending from the outer edge 32e in the tire radial direction to the land part tread surface 16s, to the entire length of the platform 32.

Furthermore, when viewed from above the tread surface, a dimension W of the platform 32 in the tire circumferential direction is a predetermined constant dimension from the platform end point 32q to the lateral-side circumferential groove 12d, and the dimension W from the lateral-side circumferential groove 12d to the inner side in the tire widthwise direction gradually decreases and becomes zero at the platform start point 32p.

Accordingly, snow traction and snow braking can be uniformly generated by the platform 32 from the platform end point 32q to the lateral-side circumferential groove 12d. A portion from the lateral-side circumferential groove 12d to the inner side in the tire widthwise direction is a lug groove portion in which the inclination angle θ of the lug groove 14 with respect to the tire widthwise direction Y gradually increases. Such a lug groove portion can taper the platform 32.

(Functions and Effects of Lateral-Side Land Part)

When a depth of a width-direction groove is the same as that of a sipe, a rigidity of a land part is greatly reduced. In order to avoid a reduction in rigidity of a land part, shallow width-direction grooves have been conventionally set so as to maintain dry brake performance and wet brake performance while securing the rigidity of the land part. Therefore, sufficient snow performance is not obtained.

In order to secure snow performance, it is effective to increase edge effect so that traction on snow can be effectively obtained.

In contrast, when the number of sipes is simply increased to increase edge effect, a sipe edge component increases. However, since the rigidity of the land part decreases, wear resistance is lowered. In addition, since the rigidity of the land part decreases and deformation of the land part becomes too large, falling of the land part becomes large and the edge effect also decreases. Especially a shoulder side to which large input is applied in the circumferential direction is greatly affected.

In the tire 10 according to the present embodiment, a in-groove sipe 42 is arranged along one side edge of a groove bottom 14b of a width-direction groove 40, in the width-direction groove 40 formed in a lateral-side land part 20.

Therefore, when the lateral-side land part 20 is released from a ground contact state, the width-direction groove 40 tends to be widened and widely opened by an amount of the in-groove sipe 42 comparing with a width-direction groove in which the in-groove sipe 42 is not formed. Therefore, an edge of the width-direction groove 40 is widely opened and bites in much snow, increasing edge effect. In addition, during ground contact of the lateral-side land part 20, it is possible to increase shear force of snow which grips and compacts much snow and discharges the snow upon releasing the ground contact.

More specifically, on a leading edge side of a lateral-side land part 20, positioned in front of a width-direction groove 40, a force in a compression direction in which an in-groove sipe 42 closes when ground contact is released upon braking. Therefore, even though an in-groove sipe 42 is added, the rigidity of the lateral-side land part 20 does not decrease. On a trailing side of the lateral-side land part 20, positioned in back of the width-direction groove 40, that is, in a lug groove wall portion exhibiting an edge effect owing to the width-direction groove 40 upon ground contact of the land part, an in-groove sipe 42 is positioned on a leading side of the width-direction groove 40, the rigidity of the lateral-side land part 20 rarely decreases, and even though a sipe is added, the edge effect of the width-direction groove 40 upon ground contact is maintained without decreasing.

That is, in order to ensure the rigidity of a leading edge side of a land part in a compression direction when braking is applied, in a width-direction groove 40, an in-groove sipe 42 is arranged along one side edge positioned on a leading edge side of the land part. Therefore, edge effect and the effect of shear force of snow are increased by widely opening the width-direction groove 40 to further improve snow performance without reducing the rigidity of the land part, and dry brake performance and wet brake performance can be maintained, and it is possible to achieve the performances which have been a trade-off.

In this embodiment, one side edge of the groove bottom 14b is a side edge 40s on a leading side S, and the in-groove sipe 42 is provided only along the side edge 40s of the leading side S. Thus, the above-described effects obtained by using the in-groove sipe 42 become more remarkable.

Note that maintaining the rigidity of the land without decreasing enables to maintain all of wet and dry brake performances, wet and dry driving performances, and wear resistance without decreasing the performances. For example, if it is desired to intensively improve wet and dry driving performances (driving performance), an in-groove sipe to be arranged in a width-direction groove 40 is desirably positioned on a trailing edge side of a land part so that a force in the compression direction acts on the trailing edge side of the land part and the in-groove sipe 42 is closed to ensure the rigidity.

In addition, one end of a width-direction groove 40 opens to a tread end T, and the other end terminates at a lateral-side circumferential groove 12d without opening. Therefore, the opening one end reduces the rigidity of a lateral-side land part 20 in a tire circumferential direction, and water entering the width-direction groove 40 is easily drained. The terminated other end increases the rigidity of the lateral-side land part 20 in a tire circumferential direction, and it is possible to restrain excessive reduction of the rigidity of the land part.

Moreover, it is possible to efficiently drain water from inside a tread surface of the tire to the outside in a tire widthwise direction. Furthermore, since the width-direction groove 40 is not open in the lateral-side circumferential grooves 12d, water does not flow into the width-direction groove 40 from the lateral-side circumferential grooves 12d, and it is possible to effectively prevent turbulence occurring in the lateral-side circumferential groove 12d and deterioration of drainage properties of the width-direction grooves 40 and the lateral-side circumferential groove 12d.

As described above, by positioning a land part on the opening side of the width-direction groove 40 on a tread end side, the drainage property is improved, and by positioning a terminal end side of the width-direction groove 40, that is, a portion where the rigidity of the land part is increased, to an inner portion in a widthwise direction of the lateral-side land part 20. Therefore, wear resistance of a portion unevenly worn or a portion badly worn can be improved, and the tire 10 having drainage performance, friction resistance, and edge effect are achieved reliably can be provided.

Furthermore, in the lateral-side land part 20, sipes 60 are arranged in land-part sections 20a and 20b on the front and rear sides in a tire circumferential direction U, a width-direction groove 40 is arranged in the central portion of the land part in the tire circumferential direction U, and the width-direction groove 40 is not arranged except for the central portion of the land part (the circumferential-direction end portion of the land part). This effectively prevents a reduction in rigidity of the lateral-side land part 20 in a tire circumferential direction at an end in the tire circumferential direction U, while further effectively increasing the edge effect of the lateral-side land part 20 by using the sipe 60.

Furthermore, in the present embodiment, a groove bottom on a terminal end side of the width-direction groove 40 is formed into an inclined surface in which a groove depth gradually become shallower toward a terminal end 40e, and a groove bottom on a side opposite to the terminal end of the width-direction groove 40 is formed into an inclined surface in which the groove depth gradually become shallower toward the outer side in the tire widthwise direction. The inclined surface has a tapered shape, sloped shape, protruding shape, or the like.

Accordingly, the rigidity of the land part is prevented from locally lowering and from generating a difference in rigidity level between the terminal end 40e of the width-direction groove 40 and the tread end T, and uneven rigidity of the land part in the tire widthwise direction Y can be suppressed. By forming the inclined surface into a slope shape, this effect becomes more remarkable.

An inclination angle β of a lug groove wall 20s on a leading side of a lateral-side land part 20 with respect to the tire widthwise direction Y is larger than an inclination angle γ of a lug groove wall 20k on a trailing side of the lateral-side land part 20 with respect to the tire widthwise direction Y.

In related art, the inclination angles on a leading side and a trailing side are similar to each other, but in the present embodiment, to improve the drainage property, a groove wall is reduced to increase a groove volume. However, water in a lug groove 14 is drained toward the tread end T located on the outer side in the tire widthwise direction. Therefore, in the present embodiment, while maintaining, without scraping, a gently inclined wall surface on a leading side which water frequently hits, the groove volume is effectively increased by scraping a groove wall on the trailing side which has little influence even though the groove wall is scraped.

In the present embodiment, it has been exemplified that one end of the width-direction groove 40 is opened at the tread end T and the other end is not opened to the lateral-side circumferential groove 12d, but the width-direction groove 40 may adopt a configuration in which the one end opens in the lateral-side circumferential groove 12d and the other end is not opened but terminates at the tread end T. In this configuration, the circumferential connection portion 46 is arranged on the tread end side which is the terminal end side.

Furthermore, in this embodiment, it has been exemplified that the width-direction groove 40 is formed in the lateral-side land part 20. However, a width-direction groove having an in-groove sipe may be formed, for example, in the center-side land part 18 arranged on the inner side from the lateral-side land part 20 in a tire widthwise direction to obtain the same effect as in the present embodiment.

<Experimental Examples>

The inventors of the present invention has determined dry brake performance and snow performance by actual vehicle test for each of tires of an example having no width-direction groove in a lateral-side land part (comparative example 1), an example having a width-direction groove but no in-groove sipe (comparative example 2), an example having a width-direction groove 40 and further the above-described in-groove sipe 42 (example 1), and an example having a width-direction groove deeper than that of the width-direction groove of example 1 (comparative example 3). Here, experimental methods for dry brake performance and snow performance in the actual vehicle test will be described below.

(Dry Brake Performance)

A 196/65R15 tire was mounted to a prescribed 15×6 J rim, filled with air to an internal pressure of 240 kPa, then mounted to a vehicle with ABS. After the surface of the tire was leveled on a dry asphalt road in a test course, braking distance which was taken to stop once sudden braking was applied at a speed of 100 km/h was measured seven times, five pieces of the measured data were selected by deleting the maximum value and the minimum value therefrom, and the five pieces of data were averaged. Then, an evaluation index of comparative example 1 is set to 100, and the other indexes are calculated using the relative index for comparative example 1 as an evaluation index. The evaluation indexes are shown in Table 1. The evaluation indexes in Table 1 show that the larger the value the better the performance for both of the dry brake performance and the snow performance.

(Snow Performance)

A 196/65R15 tire was mounted to a prescribed 15×6 J rim, filled with air to an internal pressure of 240 kPa, then mounted to a vehicle with ABS. After the surface of the tire was leveled on a snow road in a test course, braking distance which was taken to stop once sudden braking was applied at a speed of 40 km/h was measured seven times, five pieces of data of the measured data were selected by deleting the maximum value and the minimum value therefrom, and the five pieces of data were averaged. Then, an evaluation index of comparative example 1 is set to 100, and the other indexes are calculated using the relative index for comparative example 1 as an evaluation index. The evaluation indexes are also shown in Table 1. The evaluation indexes in Table 1 show that the larger the value the better the performance for both of the dry brake performance and the snow performance.

TABLE 1

|  | Comparative Example 1 WIDTH-DIRECTION GROOVE ABSENT | Comparative Example 2 WIDTH-DIRECTION GROOVE PRESENT | Example 1 IN-GROOVE SIPE PRESENT | Comparative Example 3 WIDTH-DIRECTION GROOVE SET DEEP |
|---|---|---|---|---|
| DRY BRAKE PERFORMANCE | 100 | 103 | 105 | 106 |
| SNOW PERFORMANCE | 100 | 103 | 106 | 104 |

As can be seen from Table 1, the results show that in example 1, the dry brake performance could be maintained to some extent and the snow performance could be sufficiently increased.

However, it was found that even though the width-direction groove is formed as in comparative example 2, the snow performance is not greatly improved unless the in-groove sipe is formed, and when the width-direction groove is set deep as in comparative example 3, the rigidity of the land part decreases and the dry brake performance is not good.

While certain embodiments have been described by way of example, these embodiments have been presented by way of example only, and are not intended to limit the scope of the inventions. Indeed, the embodiments described herein may be embodied in a variety of other forms; furthermore, various changes in the form of the embodiments described herein may be made without departing from the spirit of the inventions. The accompanying claims and their equivalents are intended to cover such forms or modifications as would fall within the scope and spirit of the inventions.

It should be noted that the present application claims priority to Japanese Patent Application No. 2016-091326, filed on Apr. 28, 2016, and Japanese Patent Application No. 2016-091321, filed on Apr. 28, 2016, the entire contents of which are incorporated by reference herein.

INDUSTRIAL APPLICABILITY

The tire according to the embodiments of the present invention has improved snow performance while securing the rigidity of a land part.

REFERENCE SIGNS LIST

10 TIRE
12 CIRCUMFERENTIAL GROOVE
12c CIRCUMFERENTIAL MAIN GROOVE (CENTER-SIDE CIRCUMFERENTIAL GROOVE)
12d LATERAL-SIDE CIRCUMFERENTIAL GROOVE
13 LATERAL-SIDE CIRCUMFERENTIAL GROOVE PLATFORM
14 LUG GROOVE
16 LAND PART
16s LAND PART TREAD SURFACE
18 CENTER-SIDE LAND PART
19 CENTER-SIDE LAND PART PLATFORM
20 LATERAL-SIDE LAND PART
20a, 20b LAND-PART SECTION
21 LATERAL-SIDE PLATFORM
32 PLATFORM
32e TIRE-RADIAL-DIRECTION OUTER EDGE
32p PLATFORM START POINT
32q PLATFORM END POINT
40 WIDTH-DIRECTION GROOVE
40s SIDE EDGE
42 IN-GROOVE SIPE
46 CIRCUMFERENTIAL CONNECTION PORTION
48 FIRST RECESSED LAND PART
56 WIDTHWISE CONNECTION PORTION
58 SECOND RECESSED LAND PART
S LEADING SIDE
K TIRE RADIAL DIRECTION
T TREAD END
U TIRE CIRCUMFERENTIAL DIRECTION
Y TIRE WIDTHWISE DIRECTION
W DIMENSION
α INCLINATION ANGLE
β INCLINATION ANGLE

The invention claimed is:

1. A tire comprising a tread surface,
the tread surface including:
   a circumferential groove extending in a tire circumferential direction;
   a lug groove extending in a direction intersecting the circumferential groove; and
   a plurality of land parts partitioned by the circumferential groove and the lug groove, wherein:
the plurality of land parts includes a first land part having a lateral-side circumferential groove partitioning the first land part into a lateral-side land part and a center-side land part adjacent to the lateral-side land part at an inner side in a tire widthwise direction,
the lateral-side land part is provided with a width-direction groove extending in the tire widthwise direction,
an in-groove sipe is arranged along one side edge of a groove bottom of the width-direction groove,
at the lateral-side circumferential groove, a widthwise connection portion connecting the lateral-side land part and the center-side land part is provided,
a height of the widthwise connection portion in a tire radial direction is lower than heights of tread surfaces of the lateral-side land part and the center-side land part and higher than a height of a groove bottom of the circumferential groove, and a second recessed land part bridging a space between the lateral-side land part and the center-side land part is formed by the widthwise connection portion,
a height of a groove bottom of the width-direction groove in the tire radial direction is higher than a height of a groove bottom of the lateral-side circumferential groove,
the lateral-side land part is provided with a pair of sipes arranged to sandwich the width-direction groove in the tire circumferential direction,
at least a part of the width-direction groove is formed on a shoulder part, the shoulder part being a land part including a tread edge, and
the width-direction groove further extends to an outer-side in the tire widthwise direction with respect to the pair of sipes.

2. The tire according to claim 1, wherein
the one side edge is a side edge on a leading side, and the in-groove sipe is provided only along the one side edge.

3. The tire according to claim 1, wherein
the width-direction groove has one end opening at a tread end and the other end terminating without opening to the lateral-side circumferential groove.

4. The tire according to claim 3, wherein
a circumferential connecting portion connecting two partitioned land parts of the lateral-side land part partitioned by the width-direction groove is arranged adjacent to the other end of the width-direction groove to terminate at the other end, and
the circumferential connecting portion has a height in a tire radial direction smaller than a height in the tire radial direction of tread surfaces of the two partitioned land parts, and a first recessed land part is formed by the circumferential connection portion to bridge a space between the two partitioned land parts.

* * * * *